C. H. Alsop,
Boring Gun-Barrels,

N⁰ 32,675.   Patented July 2, 1861.

Witnesses;
J. W. Coombs
R. S. Spencer

Inventor;
C. H. Alsop
per Munn &co
Attorneys

UNITED STATES PATENT OFFICE.

CHARLES H. ALSOP, OF MIDDLETOWN, CONNECTICUT.

CHUCK FOR BORING FIREARM-CYLINDERS.

Specification of Letters Patent No. 32,675, dated July 2, 1861.

*To all whom it may concern:*

Be it known that I, CHARLES H. ALSOP, of Middletown, in the county of Middlesex and State of Connecticut, have invented a new and useful Improvement in Lathe-Chucks for Boring the Chambers of the Cylinders of Revolving Firearms; and I do hereby declare that the following is a full, clear, and exact description of the same, reference being had to the accompanying drawings, forming part of this specification, in which—

Figure 3:
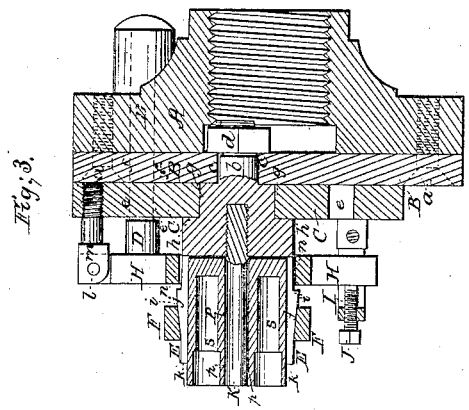
Figure 2:
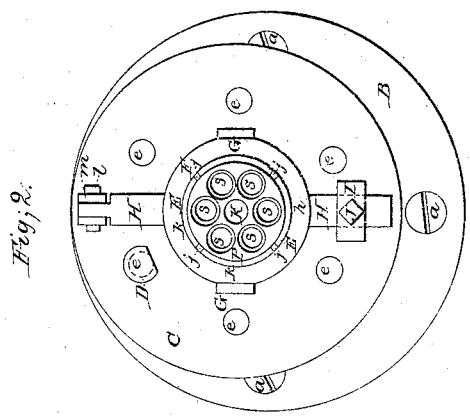
Figure 1:
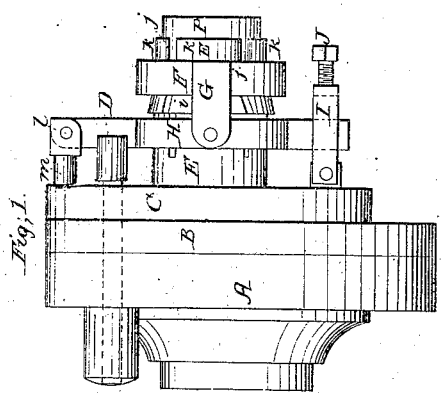

Figure 1, is a side view of a chuck with my improvement. Fig. 2, is a front view of the same. Fig. 3, is a central section of the same.

Similar letters of reference indicate corresponding parts in the several figures.

The object of my invention is to insure the boring of all the chambers of the rotating cylinders of fire arms in a true circle concentric to the axis of the cylinder; and to this end my invention consists in a certain device combined with a revolving eccentric chuck for holding the cylinder in the requisite relation to the axis of revolution of the chuck and permitting it to be turned to drill or bore the several chambers.

To enable others skilled in the art to make and use my invention, I will proceed to describe its construction and operation.

A, is the body of the chuck, which screws tightly on to the mandrel or main spindle of a lathe.

B, is a face plate secured firmly to the face of the chuck A, by screws $a, a$.

C, is the eccentric plate having formed upon, or rigidly secured to it, at its back, a central pin, or pivot $b$, which is fitted to turn in a hole $c, c$, in the plate B, and secured to the said plate by means of a nut $d$, fitted to it at the back of the plate B. The hole $c, c$, is just so much eccentric to the axis of the chuck and face plate B, as the chambers of the cylinders to be bored are intended to be to the axes thereof. In the eccentric plate C, there are provided a number of holes $e, e$, equal to the number of chambers in the cylinders to be bored, said holes being arranged at equal distances apart in a circle concentric with the central pivot $b$. In the face plate B, and body of the chuck there is a hole $f$ so arranged that by turning the eccentric plate, the holes $e, e$, may be successively brought opposite to the said hole $f$, so that a pin D, may be inserted through either hole $e$, into the hole $f$, to prevent the eccentric plate from turning relatively to the face plate B, and chuck.

E, is a cylindrical clamp for the reception of the fire-arm cylinder P, which is shown tinted of a yellow color. This clamp is rigidly secured to the eccentric plate C, in a position concentric with said plate. The most convenient way of combining this clamp with the plate is to turn down the rear portion of it, as shown at $g, g$, in Fig. 3, to be driven tightly into a hole bored in the center of said plate with a shoulder $h, h$, fitting up to the face of the plate, and to form the pivot $b$, before described, of the same piece of iron or steel with the said clamp as shown in Fig. 3. The interior of the said clamp is bored truly cylindrical, but a portion $i, i$, of its exterior is made conical, and the said cylinder has cut in it three or more longitudinal slots $j, j$, which extend the whole length of its bore, such slots forming a corresponding number of clamping jaws $k, k$. The conical portion $i, i$, of the exterior of the clamp, is fitted with a ring F, having a corresponding conical interior, and this ring is connected by two strap pieces G, G, with a lever H, one end of which is connected by its fulcrum pin $l$, with a stud $m$, secured in the face-plate B, and the other end of which is received within a stirrup I, secured to the face-plate. The lever H, is made with a ring or circular opening $n, n$, large enough to enable it to pass freely over the outside of the clamp E, and the stirrup I, is fitted with a screw J, to be screwed against the lever, for the purpose of pressing it toward the face-plate B, and so drawing the ring F, over the conical portion $i, i$, of the clamp, for the purpose of pressing the jaws $f, f$, upon the cylinder P, and clamp it firmly. In the center of the clamp there is firmly secured a rigid pin K, of a size to fit very snugly to the hole bored in the center of the cylinder P, for the reception of the axis pin on which it turns when in its place in the fire-arm, the said hole being bored and the exterior of the cylinder turned up before the chambers are bored. This pin K, it will be observed has its axis in line with the axis of the pivot $b$, and it is by the aid of this pin that the cylinder P, is chucked with its central bore $p$, true, as the clamp E, is bored of such size that when the conical ring is drawn forward off the conical portion $i, i$, of the clamp, the cylinder P, may pass easily into it, and if the exterior of the cylinder should by any accident be not quite true with its central bore, the jaws $k$, $k$, being to some extent flexible, will yield. This chucking by the central bore and not by the exterior of the cylinder insures the chambers being exactly at equal distances from the axis of the cylinder which they might not be if the cylinder were chucked by its exterior, and hence the pin K, arranged in the center of the clamp is an important feature of my invention.

The operation of boring the chambers is as follows: The cylinder P, having been inserted in the clamp E, right up to the flat rear portion of the interior thereof, is secured by screwing up the stirrup screw J. One of the holes $e$, of the eccentric plate C, is brought opposite to the hole $f$, in the face plate and body of the chuck and the pin D, inserted. The lathe is then set in motion while the drill or other boring tool is held up to the cylinder and the drilling effected by the rotary motion of the cylinder, without any rotary motion of the boring tool being necessary. When one chamber has been thus bored, the pin D, is withdrawn and the eccentric plate C, turned to bring another of its holes $e$, $e$, opposite to the hole $f$, and the pin D, inserted again, and the boring of another chamber is proceeded with in the manner above described, and this is repeated till all the chambers have been bored.

What I claim as my invention and desire to secure by Letters Patent; is—

The cylindrical clamp E, with its flexible jaws $k$, conical external portion $i$, $i$, and internally conical ring F, the lever H, and stirrup-screw J, or their equivalent and the rigid central pin K, the whole combined and applied in connection with the eccentric plate C, of the lathe chuck substantially as and for the purpose herein specified.

CHARLES H. ALSOP.

Witnesses:
  WALDO P. VINAL,
  CLINTON SAGE.